G. F. FISHER.
TIRE BUILDING MACHINE.
APPLICATION FILED SEPT. 22, 1916.

1,288,862.

Patented Dec. 24, 1918.

WITNESS:
S. G. Taylor.

INVENTOR.
George F. Fisher,
BY
Ernest Hopkinson
HIS ATTORNEY.

UNITED STATES PATENT OFFICE.

GEORGE F. FISHER, OF ROSELLE, NEW JERSEY, ASSIGNOR TO MORGAN & WRIGHT, A CORPORATION OF MICHIGAN.

TIRE-BUILDING MACHINE.

1,288,862.  Specification of Letters Patent.  Patented Dec. 24, 1918.

Application filed September 22, 1916. Serial No. 121,553.

*To all whom it may concern:*

Be it known that I, GEORGE F. FISHER, a citizen of the United States, residing at Roselle, county of Union, State of New Jersey, have invented certain new and useful Improvements in Tire-Building Machines, of which the following is a full, clear, and exact description.

This invention relates to the manufacture of tires, and has for an object to provide an improved and simplified mechanism for shaping a tire to a ring core.

In the manufacture of tires it is customary to apply layers of fabric successively to a ring core, each layer as it is applied being centrally pressed against the medial portion of the core and then being pressed at the sides against the sides of the core, this later operation usually being manually performed or power performed by radially moved disks which operate at opposite points on the sides of the tire.

The present invention provides a novel device which simultaneously shapes all points in a diagonal line from the medial portion to near the inner edge portion of the tire without being manually or otherwise operated, in contradistinction to the usual disks which must be moved radially of the tire to accomplish their purpose.

With the above objects in view the invention consists of certain novel details of construction and combinations of parts hereinafter fully described and claimed, it being understood that various modifications may be resorted to within the scope of the appended claims.

In the accompanying drawing forming part of the specification:

Figure 1:
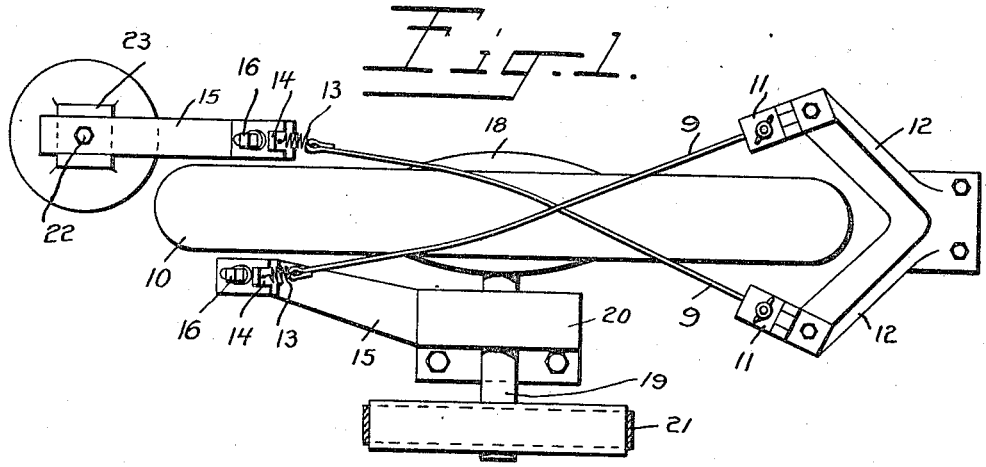
Figure 1 is a plan view of one embodiment of my invention.
Figure 2:
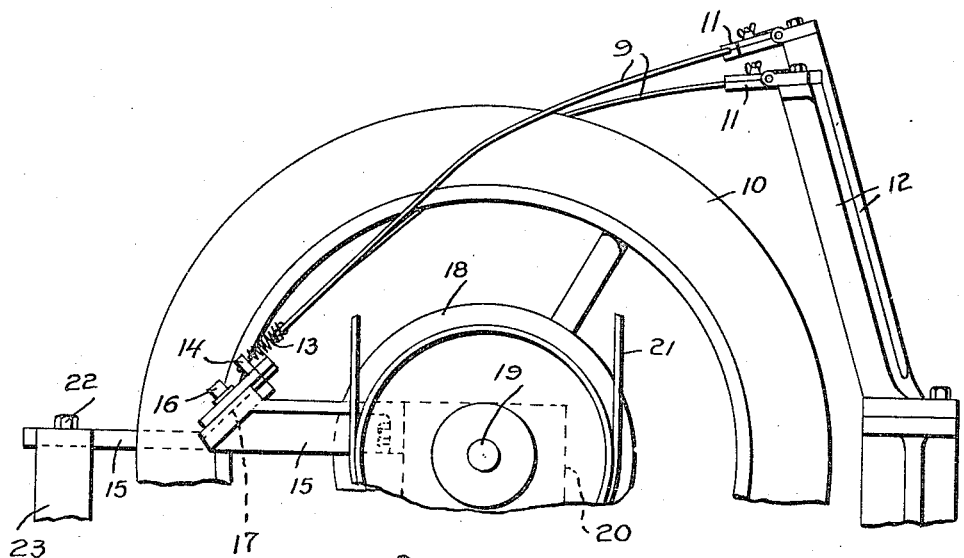
Fig. 2 is a fragmentary side elevation of the device.

In one embodiment of the invention, I provide a pair of wires 9, having the stiffness and body of heavy piano wires, the same being disposed obliquely upon opposite sides of the ring core 10, and crossing each other one in advance of the other at the medial portion of the ring core as shown in Figs. 1 and 2. One end of each wire is removably secured in a clamp 11 which is secured to a support 12 adjacent to and above the core. The opposite end of each wire is connected by a helical spring 13 with an eye plate 14 which is adjustably secured to a support 15 by a slot and thumb-screw 16—17 whereby the tension of the spring and consequently the tension of the wire may be controlled.

The ring core is removably mounted as usual upon a spider 18 carried by a shaft 19 which is supported upon the standard 20 and is power driven by the belt drive 21 or otherwise. To facilitate application and removal of the core to the spider, one of the supports 15 is in the present embodiment shown as removably secured by a bolt 22 to a standard 23. Said support may be detached from the standard to permit a tire core to be slipped laterally into position on the spider and withdrawn laterally from the spider in the usual manner.

Figure 3:
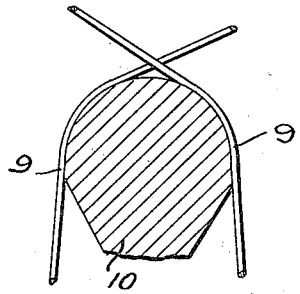
Fig. 3 is a detail cross sectional view of the device.

In operation, the ring core is revolved and draws the fabric upon itself under tension from a stock roll of rubber treated fabric in the usual manner, the fabric adhering centrally to the medial portion of the core. During the application of each ply of fabric in this manner the wire shaping tools 9 operate simultaneously to press down the fabric at all points in a diagonal line from the medial portion to near the edge portion, as shown in Fig. 3 of the core. During rotation of the core underneath the wires the fabric plies will be pressed down and shaped intimately to the curved surface of the core at all points.

Since the wires extend diagonally across the core, they wipe the fabric in a slanting direction from the medial portion of the core toward the inner edge portion of the core thereof, and consequently entrapped air will be wiped gradually toward and expelled from the edges of the tire, and immediate contact and adhesion of the plies with each other at all points effected. As the tire carcass increases in diameter due to accumulation of plies upon the core, the springs 13 may be slackened, so that the pressure of the wires may be maintained uniform upon all the plies.

Having thus described my invention, what I claim and desire to protect by Letters Patent is:

1. In a tire building machine, a support for the tire, flexible means for forming the tire upon said support, means for advancing successive portions of said support relative to said forming means, said forming means being adapted to be flexed to engage a continuous portion of said tire of substantial length and in an oblique direction extending upwardly toward the advancing portion of the tire, and anchorages disposed on opposite sides of the support to which are secured the opposite ends of said forming means.

2. In a tire building machine, a support for the tire, flexible means for forming the tire upon said support, means for advancing successive portions of said support relative to said forming means, said forming means being adapted to be flexed to engage a continuous portion of said tire of substantial length and in an oblique direction extending upwardly toward the advancing portion of the tire, a tension device yieldingly holding said forming means at one end, and an anchorage for the other end on the opposite side of said support from said tension device.

3. In a tire building machine, a support for the tire, a plurality of flexible shaping members arranged in crossed relationship and disposed substantially in planes intersecting the plane of said support and means for advancing successive portions of said support relative to said shaping members.

4. In a tire building machine, a support for the tire, a plurality of flexible shaping members arranged in crossed relationship and disposed substantially in planes intersecting the plane of said support, means for advancing successive portions of said support relative to said shaping members, and a tension device yieldingly holding said forming means.

Signed at New York, N. Y., this 18th day of September, 1916.

GEORGE F. FISHER.

Copies of this patent may be obtained for five cents each, by addressing the "Commissioner of Patents, Washington, D. C."